United States Patent
Poyraz

(10) Patent No.: US 11,286,602 B2
(45) Date of Patent: Mar. 29, 2022

(54) WASHING MACHINE

(71) Applicant: Vestel Elektronik Sanayi ve Ticaret A.S., Manisa (TR)

(72) Inventor: Uygar Poyraz, Manisa (TR)

(73) Assignee: Vestel Elektronik Sanayi ve Ticaret A.S.

( * ) Notice: Subject to any disclaimer, the term of this patent is extended or adjusted under 35 U.S.C. 154(b) by 248 days.

(21) Appl. No.: 16/361,751

(22) Filed: Mar. 22, 2019

(65) Prior Publication Data

US 2019/0292707 A1    Sep. 26, 2019

(30) Foreign Application Priority Data

Mar. 23, 2018  (EP) ..................... 18163796

(51) Int. Cl.
| | |
|---|---|
| *D06F 33/00* | (2020.01) |
| *D06F 29/00* | (2006.01) |
| *B65G 51/02* | (2006.01) |
| *D06F 39/12* | (2006.01) |
| *D06F 93/00* | (2006.01) |
| *H04N 5/225* | (2006.01) |
| *D06F 34/18* | (2020.01) |

(52) U.S. Cl.
CPC ............ *D06F 29/00* (2013.01); *B65G 51/02* (2013.01); *D06F 39/12* (2013.01); *D06F 93/00* (2013.01); *B65G 2201/0229* (2013.01); *D06F 34/18* (2020.02); *H04N 5/2254* (2013.01)

(58) Field of Classification Search
CPC ..................................................... D06F 33/00
See application file for complete search history.

(56) References Cited

U.S. PATENT DOCUMENTS

| | | | | |
|---|---|---|---|---|
| 6,094,763 | A * | 8/2000 | Engel | D06F 95/00 |
| | | | | 34/236 |
| 7,404,303 | B1 * | 7/2008 | Barbosa | D06F 37/10 |
| | | | | 68/3 R |
| 2009/0113638 | A1 | 5/2009 | Kim | |
| 2018/0002859 | A1 * | 1/2018 | Hombroek | D06F 39/02 |

FOREIGN PATENT DOCUMENTS

WO    2013083675    6/2013

* cited by examiner

*Primary Examiner* — Jason Y Ko
(74) *Attorney, Agent, or Firm* — Conley Rose, P.C.

(57) ABSTRACT

The disclosure provides a washing machine including a drum, a container for holding items to be washed, a weight sensor for sensing the weight of items in the container, and a transfer mechanism configured to automatically transfer the items from the container to the drum when the weight sensed by the weight sensor reaches a pre-determined threshold. The disclosure also provides a method for washing items using a washing machine.

13 Claims, 3 Drawing Sheets

WASHING MACHINE

CROSS REFERENCE TO RELATED APPLICATIONS

This application claims benefit of priority to European Patent Application Serial No. 18163796.8 filed in the European Patent Office on Mar. 23, 2018, and entitled "A Washing Machine," which is hereby incorporated herein by reference in its entirety.

STATEMENT REGARDING FEDERALLY SPONSORED RESEARCH OR DEVELOPMENT

Not Applicable

BACKGROUND

The present disclosure relates to a washing machine and a method for washing items in a washing machine.

Since the advent of the automatic washing machine in the 1930s, their prevalence has increased to the extent that almost every household now owns one and uses it on a regular basis. Various improvements have been made over the last 80 or so years, for example to introduce drum suspension in order to prevent the machine from "walking" due to the vibrations produced by the spinning drum in use. Very modern machines even allow a user to wash more than one separate load simultaneously, as well as being controllable via Wi-Fi.

Although the quality of the wash, as well as the effectiveness of cleaning products available, have improved greatly in this time, a high level of human input is still required in order to complete a wash. A user is required to sort the washing into separate categories, place a load in the drum of the washing machine, select and insert cleaning products, select a suitable wash cycle and switch on the machine. Once the washing cycle is complete, it is also necessary for the user to remove the washed laundry from the machine and hang this up for drying (if the machine does not double up as a dryer). Perhaps surprisingly, there have been relatively few improvements in terms of reducing the level of human interaction required to use such a machine. In addition, users often do not observe the weight requirements of a particular washing machine model and will overfill the machine in order to save time. This can lead to malfunctions or even damage to the machine.

US-A-2009/0113638 describes a system for sorting washing including a storage container with a number of separate boxes. A user places items in the boxes according to pre-programmed categories. Each box is associated with a weight sensor which records in a memory the weight of clothes within. Information is transmitted to a washing machine regarding the category and weight of clothes and this is used to set an appropriate washing cycle when the user manually places clothes from the box into the machine. In one embodiment, a piece of laundry can be associated with an information medium (such as an RF card or bar code). This information medium is used by the controller of the system to determine which box the user should place the laundry into and/or to determine which washing cycle will be used by the machine.

WO-A-2013/083675 describes a washing machine including a drawer at its base in which clothes are placed prior to washing. A weight sensor and display screen on the front of the machine communicate the weight of clothes in the drawer to a user. Once the weight of the laundry reaches a threshold level, the user is prompted to perform a wash by way of a visual or audible alarm. The system may also recommend a washing cycle or dosage of detergent to the user based on the weight data, and may cause a suitable volume of detergent to be dispensed, however the user is then required to set up the washing cycle manually as usual.

Although some steps have been made towards improving the ease of performing a wash using an automatic machine, further developments will be welcomed. In particular, a high level of user interaction is still required in order to perform a wash, and this is clearly undesirable for those with demanding schedules or with physical ailments which may make housework more difficult to perform.

SUMMARY OF THE DISCLOSURE

According to a first aspect of the present disclosure, there is provided a washing machine comprising: a drum; a container for holding items to be washed; a weight sensor for sensing the weight of items in the container; and a means for automatically transferring the items from the container to the drum when the weight sensed by the weight sensor reaches a pre-determined threshold. Preferably, the washing machine is a domestic washing machine, i.e., of a size suited for use in the home. The means for automatically transferring is a transfer apparatus or mechanism. Including a means by which laundry can be transferred to a machine at an opportune time without requiring input from a user will reduce the effort involved in completing a wash whilst ensuring that the machine is not overloaded, and that dirty washing is not left for too long in a situation where it may start to smell.

In embodiments, the drum includes a movable wall portion which can be moved to expose an opening in the drum wall through which items can be transferred to the drum. This allows items to be transferred to the drum in a manner which can easily be configured to occur automatically so that the drum can be sealed effectively when a wash cycle is ongoing.

In embodiments, the moveable wall portion is mounted on rails and is moveable by sliding along the rails. Moving a portion of the wall by sliding minimises the space taken up by the mechanism and is fairly easily integrated into a larger mechanism for automatically moving the wall portion to expose the opening.

In embodiments, the moveable wall portion is coupled to the rest of the drum wall by a hinge and is moveable by rotation about the hinge. Although this will require more space within the machine, the provision of a seal is less complex since the wall portion can be moved to cover the opening using a single pivoting movement about the hinge.

In embodiments, the moveable portion is automatically moveable. It is therefore not necessary to ensure the opening to the drum is exposed before leaving the machine in its automatic mode.

In embodiments, the washing machine comprises a pipe through which items can be transferred from the container to the drum. In embodiments, the washing machine comprises a suction device for sucking items along the pipe towards the drum. This is a convenient way in which to automatically transfer items from container to drum and is workable in situations where the container is located below the drum of the machine (which may be advantageous in terms of space saving).

In embodiments, the washing machine comprises a plurality of suction devices located at intervals along the pipe, wherein the suction devices are operable to be progressively activated to suck the items up the pipe. Items can be accelerated up the pipe, which will help them to clear the end of the pipe near to the drum. This method may also result in items being more easily pulled up the pipe one at a time, which may help in a situation where an additional reader is included (as described below).

In embodiments, the washing machine comprises a plurality of containers, wherein each container is allocated to a category of item, and a visual display configured to indicate the category of each container to the user. A wash which is automatically initiated will include only one category of item, which will help to tailor the wash cycle to the items present.

In embodiments, the washing machine comprises a reader for gathering additional information about the items as they are transferred from the container to the drum. In embodiments, the reader is a radio frequency identification (RFID) reader and the items are provided with RFID tags. It not necessary using an RFID reader for the tag to be visibly exposed to the reader (rather than hidden behind a portion of the item, for example) in order that the tag can be read, which may require some extra effort on the part of the user or which may be more difficult in practice to achieve.

In embodiments, the reader is an optical camera for taking images of labels on the items of clothing and transmitting the images to an image processor. Use can be made of information which is present (by law) on items of clothing from the time of manufacture.

In embodiments, the washing machine comprises a controller for determining a wash cycle based on the additional information and automatically initiating the wash cycle once the items have been transferred to the drum. In embodiments, determining the wash cycle comprises determining a temperature and/or a duration of the wash cycle. A wash cycle can be extremely well tailored to the items present without any input required from a user. Damage to items which have inadvertently been grouped with more hardy items can also be avoided in this way.

According to a second aspect of the present disclosure, there is provided a method for washing items in a washing machine, the method comprising: sensing, by a weight sensor, the weight of items within a container; when the weight reaches by the weight sensor reaches a pre-determined threshold, automatically transferring the items from the container to the drum of the washing machine.

In embodiments, the method comprises automatically initiating a wash cycle once the items have been transferred to the drum.

In embodiments, the method comprises reading, by a reader, additional information from the items as they are transferred and using this additional information to select the wash cycle.

According to a third aspect of the present disclosure, there is provided a system for washing items, the system comprising: a washing machine including a drum; a weight sensor coupled to a container and configured to sense the weight of items in the container; a controller configured to initiate the automatic transfer of items from the container to the drum when the weight of items in the container reaches a pre-determined threshold.

In embodiments, the system comprises a reader configured to read additional information from the items as they are transferred.

In embodiments, the system comprises a processor for processing the additional information, wherein the controller is configured to receive the processed information from the processor, select a wash cycle based on the received information, and cause the wash cycle to be initiated once the items have been transferred to the drum.

In an embodiment, the washing machine comprises means for automatically initiating a wash cycle once the items have been transferred to the drum.

BRIEF DESCRIPTION OF THE DRAWINGS

Embodiments of the present disclosure will now be described in detail with reference to the accompanying drawings, in which.

DESCRIPTION OF EXEMPLARY EMBODIMENTS

Figure 1:
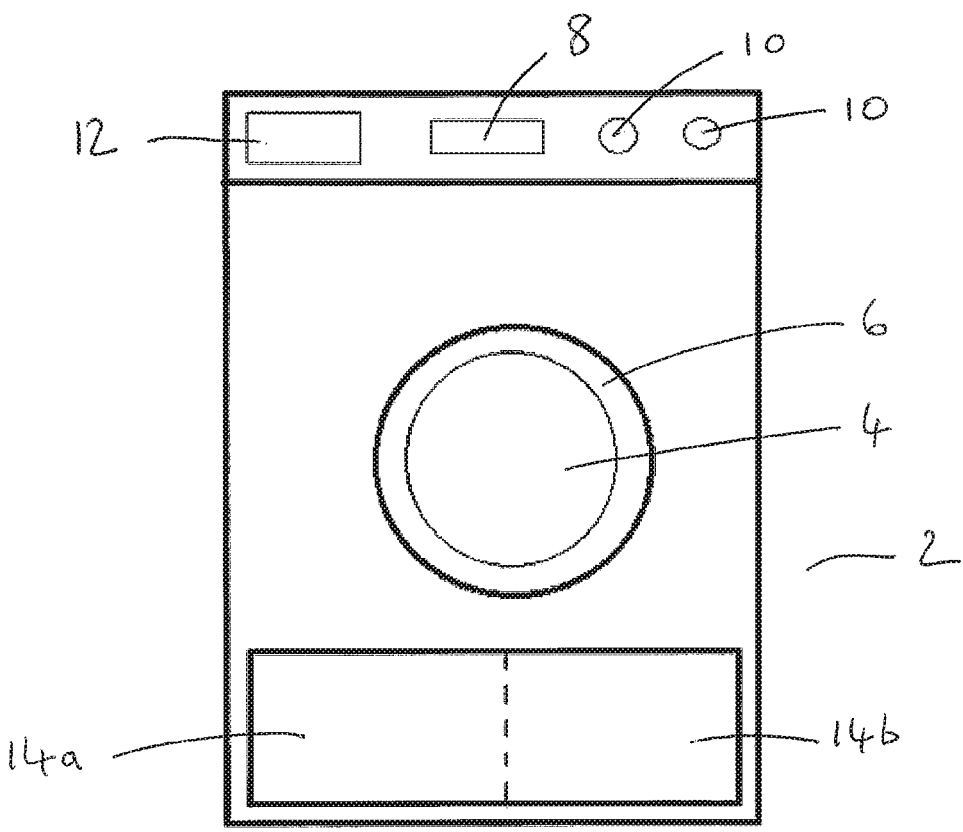
FIG. 1 shows a washing machine according to an embodiment of the present disclosure.

An automatic washing machine 2 according to an embodiment of the present disclosure is shown in FIG. 1. The machine is generally intended for use in a domestic setting, and includes a drum 4 into which washing is inserted and which is caused to spin via an electronically controlled motor during a wash cycle. The drum may include various protrusions (not shown in FIG. 1) on its inner surface to help to toss the laundry efficiently and a means by which washing products can reach the inside of the drum during a cycle. The machine will also generally include a door 6 with a water-tight seal to close the drum at the front of the machine.

In this example, a visual display or display panel 8 is mounted at the front of the machine and can indicate to a user the status of the machine before, during, or after a wash cycle. Various input buttons 10 are also provided for manually setting the wash cycle (temperature, duration, and whether to include a drying phase, for example) and for stopping and starting the machine. Slidable container 12 is accessible from the front of the machine and can be pulled out and filled or partially filled with detergent and/or fabric conditioner or other washing products prior to a cycle. The machine may also include other more modern adaptions such as hydraulic or spring suspension for the drum, water jets, or steam nozzles.

Figure 2:
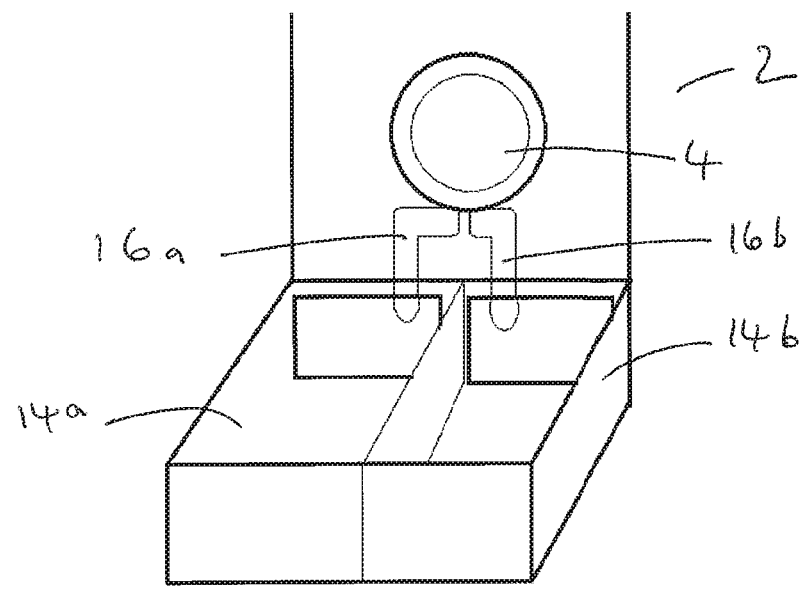
FIG. 2 shows the washing machine of FIG. 1 showing two drawers and pipes for transferring items from the drawers to the drum of the washing machine.

The machine 2 includes one or more containers 14 (two are shown in the figures). These may be separately accessible from the front of the machine (for example as drawers or via an opening, flap, or chute) and may be located below the drum as shown in FIGS. 1 and 2. This represents an efficient use of space given other components present in a standard domestic machine.

In alternative embodiments, the containers may also be located to the side of or above the drum, which may make them easier to access without requiring the user to bend down. In a case where the containers are located at the top of the machine, they too may be accessible from above; for example, through a movable lid or the containers may be open-topped. Such an open-topped configuration will help to air the clothes and simply requires the user to drop dirty laundry into the containers from above in the same way as one would generally fill a laundry basket. Containers may be located in a position that is remote from the machine itself (and even in a different room), in which case a pipe or chute will be required to transfer items from the containers into the machine.

Where more than one container 14 is included, each may be allocated to a particular type of fabric or to a particular colour of garment. Drawer 14a, for example, may be intended to contain dark or coloured fabrics and drawer 14b to contain white or light coloured fabrics. Alternatively one drawer may be used to contain delicates and another for more hardy fabrics, such as cottons. Some indication may be provided on the containers or drawers themselves to make a user aware of which fabrics should be placed in each. This indication may be provided by way of an electronic display, such that the configuration of the drawers can be adapted (automatically or manually) to suit the needs of a particular user. Users may regularly wash delicate fabrics, for example, in which case settings can be fixed such that separate drawers are indicated for delicates and for other fabrics. More than two containers may be included (from three to six containers, for example) so that laundry can be separated both by colour and by fabric type, or sorted instead or additionally by other properties of the items such as their level of cleanliness.

The one or more containers 14 each include an opening which provides a route for items of laundry leading from the container to the drum of the washing machine. FIG. 2 illustrates an example embodiment, wherein two drawers are located at the base of the machine underneath the drum, as for FIG. 1. A respective pipe 16a, 16b is coupled to of the respective one of the drawers 14a, 14b and leads to the drum of the machine. The pipes are shown schematically in FIG. 2, but they may take any suitable form. For example, they may include smooth corners to aid the movement of items up into the drum.

The drum itself 4 includes an opening portion (as will be described later), which is configured to open automatically to expose the end of a respective pipe 16a, 16b to the inside of the drum. Items within a respective drawer can be transferred through the respective pipe 16a, 16b into the drum when the moveable portion on the drum, and the drum itself, are positioned such that the opening is exposed to the end of one or both pipes. When the container or containers are located below the drum, a force is required to lift clothes from the container to the drum. A pressure gradient may be used to generate a suction force to lift the clothes. For example, a device which draws air within the pipe from a lower end to an upper end can be included to pull clothes within the respective one of the drawers 14a, 14b up through the respective one of the pipes 16a, 16b and into the drum.

In embodiments, a separate suction device may be provided for each pipe 16a, 16b and these may be separately activated depending on which drawer is determined to be full. In embodiments, a suitable suction device for use with the present apparatus is a centrifugal fan. Alternatively, a vacuum pump may be used. Such a partial vacuum may be formed in the drum of the washing machine or at the top end of the pipe. An exhaust port can be provided to transfer exhaust air away from the machine (for example through another pipe).

As described above, a plurality of containers may be included (as in the example shown in FIGS. 1 and 2 which include two separate drawers). If more than one drawer is present, a separate pipe may be fixed in place to transfer clothes from each respective container into the drum. Pipes or a single pipe may be movable in order that the pipe or each pipe can be positioned so that the end furthest from the container is located adjacent the opening in the drum. Alternatively, the opening may be large enough to expose the ends of all of the pipes to the drum at once, so that items can be transferred to the drum through any of the pipes (some of the pipes may need to be blocked off automatically if the suction force is to be generated in the region of the drum so that items travel up one pipe at a time). Alternatively, the opening itself may be moved automatically by rotating the drum such that the opening coincides with the end of a particular pipe, or more than one opening may be included, so that the drum can be positioned with one opening coincident with the end of each pipe. If more than one opening is included, these can be separately openable by using individual moveable wall portions.

FIG. 2 shows the pipes 16a, 16b extending upwardly from the drawers to the base of the drum 4. The pipes may also be configured such that items will enter the drum at the top or at one side. In such a case the opening to the drum will also be located at the top or side of the drum in a position that is coincident with the end of the pipe when the drum is positioned to receive laundry. This ensures that items can move along the pipe and through the opening into the drum. The suction device will pull laundry into the drum, at which point it will drop from the opening to the base of the drum, which will help to prevent clogging of the pipe.

In some embodiments, it may be advantageous for the suction device to be located on a side of the drum opposite to the opening exposing an end of the pipe to create a partial vacuum throughout the drum. This will ensure that laundry is pulled far enough to clear the exposed end of the pipe and enter the drum. In all cases, but in particular where the suction device is located at the end of the pipe and items enter the drum from the side or above, the suction may be pulsed (applied intermittently). This will help laundry to fall into the base of the drum and again help to prevent clogging at the exposed opening to the pipe. Suction may also be applied by sucking air out through the sides of the drum itself. In such a case openings may be provided in the drum, and these can be closed and sealed during a wash cycle. Air is sucked from the pipe and the drum and out through the walls of the drum (and may be expelled at the back of the machine or elsewhere). This way laundry will be forced through the pipe and towards the sides of the drum. Again, pulsing may help to prevent blockages of the suction port or ports.

Alternatively or in addition to the above, suction mechanisms may be included along the length of the pipe and may be progressively activated in order to accelerate items of laundry up the pipe such that they exit the end of the pipe at speed. This may be particularly useful in a situation where the pipe extends to the base of the drum as shown in FIGS. 1 and 2 and will help to separate items of laundry as they are transferred from the container to the drum, which will be helpful if a mechanism is included for reading tags or labels on the items as they pass through the pipe (as is described in more detail below).

Such suction mechanisms may be located outside of the pipe itself (to prevent occlusions) and may act to draw air from the pipe, for example through a series of small holes spaced around its circumference or periphery. Several rings of such holes may be located at intervals along the pipe and suction initiated in the ring directly above the item to be transferred. Once the item has passed a first suction device, this may be deactivated and the next suction device (again located nearest to and above the item) activated, and so on as the item moves up the pipe towards the drum.

Sensors may be included which are able to detect the position of the item within the pipe. For example, photodetectors and emitters may be positioned on opposite sides of the pipe just below or coincident with each suction device. When an item reaches the level of the detector, light from the emitter will be blocked and this drop in light level will be detected on the other side of the pipe by the photodetector. Suction can then be automatically deactivated for that suction device and activated at the suction device located immediately adjacent and further along the tube towards the drum.

Figure 3A:
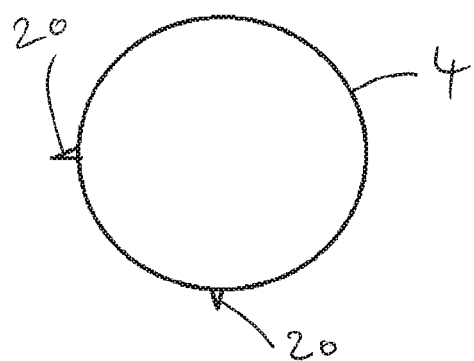
FIG. 3A shows a cross-section of a washing machine drum with rails and suitable for use with the washing machine of FIGS. 1 and 2.
Figure 3B:
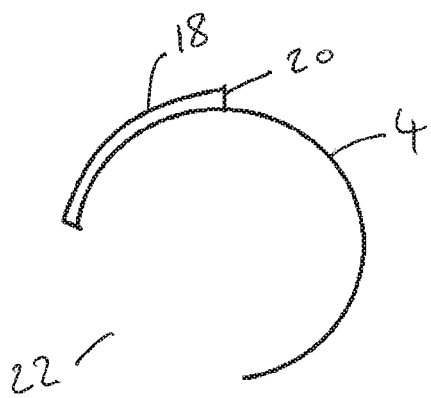
FIG. 3B shows the cross-section of FIG. 2A including a movable portion and suitable for use with the washing machine of FIGS. 1 and 2.
Figure 4:
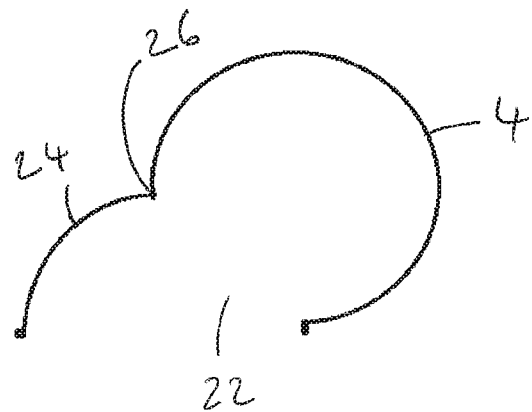
FIG. 4 shows an alternative configuration for a drum and movable portion and suitable for use with the washing machine of FIGS. 1 and 2.

The opening in the drum may be provided in several ways. Two examples are shown in FIGS. 3A, 3B, and 4. The drum 4 shown in FIGS. 3A and 3B includes a slidable/moveable wall portion 18 (FIG. 3B), which may be located on rails 20 extending away from the drum 4. Rails may extend inwardly towards the centre of the drum such that the slidable portion is located adjacent the inner surface of the drum or may be located on the outer surface of the drum as shown in FIG. 3A. The slidable wall portion 18 may extend around roughly a quarter of the circumference of the drum 4 as shown, however this is not essential and any size or shape of opening can be used. The movable portion is configured to slide on the rails to expose an opening 22 which may similarly extend around roughly a quarter of the circumference of the drum and may extend about ⅕ to ⅓ of the way along the length of the drum, but which will preferably be smaller than or correspond generally in size and shape to the slidable portion such that the opening can be completely covered by the slidable portion in its closed position. The opening may be located at any position along the length of the drum surface. Any shape or position can be used for the opening so long as it can be located to coincide with the end of the pipe leading from the container or with an opening or chute leading from a container to allow items to pass from the pipe and into the drum. The opening in the drum may, for example, be circular and may correspond roughly to the shape of the open end of the pipe. The pipe may be fixed in position such that it its end can be made to lie adjacent the opening in the drum during loading. If this is the case, and several containers are to be provided, the pipe may divide part way along into several separate pipes each leading to one of the containers.

A seal should be provided between the movable portion and the drum in order to seal the opening and prevent leakage of water from the drum during a wash cycle. Seals may be formed of, for example, rubber and may be located around the periphery of one or both of the opening and the movable portion. In such a case, it may be preferable for the movable portion to be movable towards and away from the drum as well as being slidable along the rails. This means that, once the movable portion is located above the opening, it is also movable towards the opening to help to seal it. This allows the moveable portion to both slide sideways away from the opening and provide an effective seal with the drum. The movable portion may be configured to slide along the rail via the action of one or more motors, for example via the use of teeth on the rail and a turning cog on the movable portion. The movable portion may also be cause to slide to expose the opening via the action of electromagnets, which when switched on pull the movable portion away from the opening via magnetic attraction between a part of the movable portion and another part of the apparatus.

FIG. 4 shows an alternative configuration for the movable portion and opening 22 in the drum. In this case the movable portion 24 is hinged to the drum by hinge 26 and swings outwards away from the centre of the drum or inwards towards the centre of the drum to expose the opening (an inwardly swinging portion may be more convenient as this will interfere to a lesser extent with the pipes located near to the opening). Again a seal of rubber or another material should be provided to prevent leakage of fluid once the opening is closed and the wash cycle is underway.

In both cases, the moveable portion may be configured to slide or swing to expose the opening automatically and the drum may be caused to rotate automatically in order to locate the opening over the end of a pipe leading to a container. The drum may also be movable in a backwards or forwards, or side-to-side motion in order to locate the opening in the drum such that it is coincident with the end of the pipe.

An alternative embodiment includes one or more containers located above the drum. An opening in the drum is again exposed by movement of a moveable portion of the drum wall, however no suction is required. The base of the container or containers also comprises an opening and the apparatus can, in embodiments, include a pipe or chute leading from the opening in the base of the container to the opening in the drum. When clothes are to be transferred to the drum, the opening in the container base is caused to open and clothes simply fall under the action of gravity down the pipe (if present), through the opening in the drum, and into the drum itself. The opening in the drum can then be automatically closed and sealed as for the above embodiments, and an appropriate wash cycle initiated.

Figure 5:
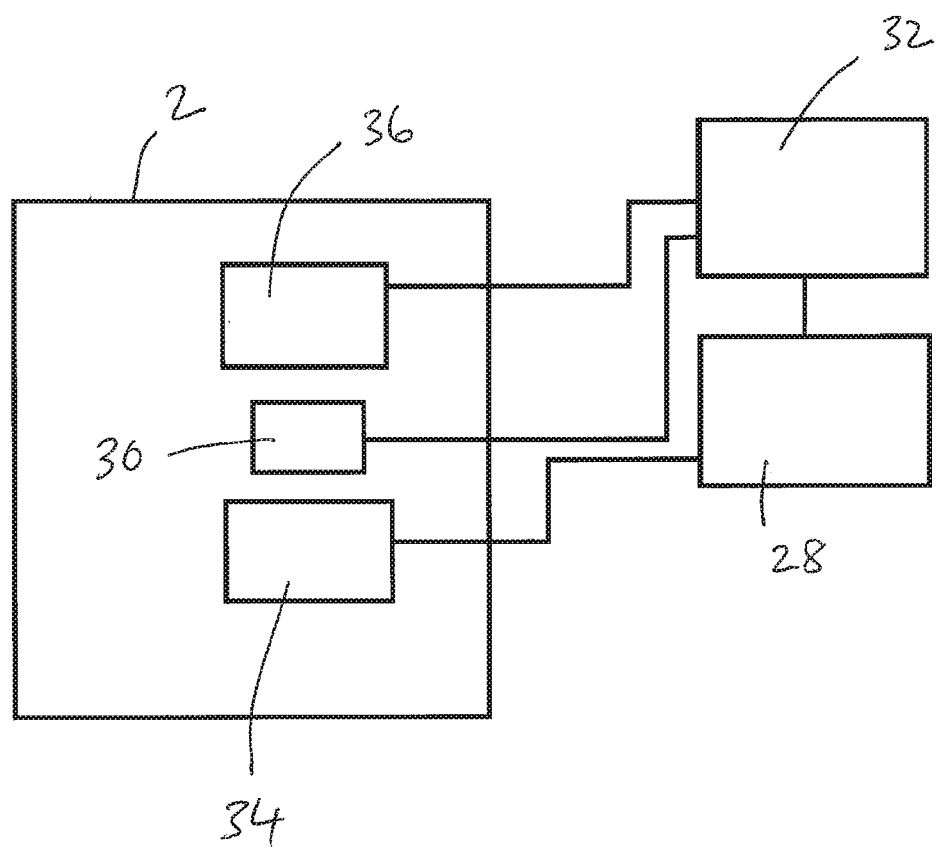
FIG. 5 shows a general schematic diagram of a system for transferring and washing laundry items automatically according to an embodiment of the present disclosure.

FIG. 5 illustrates a system for washing items of laundry including a controller 28. Containers may each be associated with a weight sensor 30 (such as a pressure sensor) which is operable to detect a weight of the items of laundry within the container and provide this information to the controller 28, possibly via processor 32. This may be, for example, a strain gauge.

Once the weight of the clothes reaches a threshold value (which may be pre-programmed depending on the capacity of the associated washing machine), a transfer mechanism 34 for transferring items from the drawer into the machine can be automatically activated by the controller 28. In other words, once an item of clothing is added which takes the weight of items in the container over the threshold, these items will be transferred to the drum automatically. The weight threshold may therefore be set to slightly below the stated capacity of the washing machine or drum, so that even though the actual weight of items may be slightly greater than the threshold, it will not be higher than the washing machine is able to manage.

Once the items are transferred to the drum and the opening in the drum sealed, an appropriate wash cycle can be initiated automatically, again by the controller. The system may determine that the clothes have been transferred to the drum successfully either by way of another weight sensor in the drum itself, or by a determination that the weight of items in the particular container is now zero (or falls below a threshold). The user may be provided with a warning that a cycle is about to begin in order to give them the option of cancelling the cycle if desired. An alarm signal (such as an audible, visual, or tactile signal) can be provided. A signal may be transmitted by the controller to a selected device of the user wirelessly so that they can cancel an automatic wash remotely in some embodiments. If no input is provided by the user within a pre-programmed length of time to indicate that they wish to cancel the wash cycle, then a wash cycle may be automatically initiated.

The washing machine may be configured to have a separate automatic and manual mode, wherein the mode at any time can be determined by the user (user input may be by way of a button on the machine, for example, or the mode may be selected via input to device of the user, such as a mobile phone). Items will only be automatically transferred and a wash cycle automatically initiated when the machine is in the automatic mode, otherwise the machine will operate substantially as a traditional domestic washing machine.

Information may also be provided to the controller regarding the category of garments entering the drum. This may be based on the category associated with the particular drawer (as described above). This information may be used by the controller to determine which type of wash cycle to initiate. The temperature and length of the cycle may be adapted to suit the category of garment (e.g., whether the items are coloured or whites, or whether or not they are delicates). In some embodiments, a suitable type and amount of detergent and/or softener may be dispensed automatically by the controller based on the weight and type of the items present, for example via an opening in the base of detergent drawer 12 which automatically opens for a particular length of time to allow the desired amount of cleaning product to be dispensed. The type of cleaning product (e.g., whether to add fabric softener along with washing power) can also be selected if more than one compartment is included in the drawer 12.

Additional information may be provided to the controller using a reader mechanism 36 which collects information from individual items entering the drum. The washing cycle and/or cleaning products to be dispensed can then be adapted by the controller to account for the garments present. One way in which this may be achieved is to provide items with an individual tag, such as a radio frequency identification (RFID) tag. A radio frequency identification (RFID) reader may be coupled to the pipe, container, or drum and may be operable to collect information from the tag as the item passes from the container into the drum. The RFID tag may have recorded thereon one or more of a desired washing temperature for the item, a maximum washing temperature for the item, in indication that the item is delicate, an indication of a material (or materials) from which the item is made, a percentage content of different fibers, and an indication that the item must be hand washed (among others).

An alternative mechanism for collecting additional information from individual items is to use an optical camera as the reader. The camera captures images of the labels of items as they move up the shoot which are then passed to processor 32 and subsequently controller 28. Such labels are required by law to include certain information related to the care of the garments and use of labelling which is present at the time of manufacture negates the need to provide items with additional tags. This method, however, may require a user to ensure that any clothing is turned inside-out before washing to expose any labels present to the camera. A suction mechanism which is able to pull items substantially one at a time through the pipe (such as the progressive suction embodiment described above) may be more suitable if an optical camera is used as the reader to ensure that labels are exposed. Once an image of the label is taken and passed to processor 32, image recognition may be used to identify particular symbols and/or text on the labels. Such symbols and text generally indicates a preferred temperature for the wash, whether the item is delicate, and the type(s) of fabric from which the item is made. A reader (e.g. an RFID reader or camera) may be located within the tube leading to the drum, or at the opening to the drum. An optical camera will also allow information on the colour of the item or at least part of the item to be collected, which can be used by the controller in addition to or instead of information derived from the labels to determine the length and temperature of a wash cycle.

Various actions may be performed by the controller depending on the additional information collected. For example, a washing temperature for the automatic cycle can be determined in a number of ways. The preferred washing temperature for each of the items can be averaged by the processor and a temperature used for the wash which is closest to this calculated average. The highest selectable setting for the machine that is cooler than the maximum wash temperature for all of the items can also be used. For example in the case of a washing machine with 20° C., 30° C., 40° C., and 50° C. settings, if five items of laundry are loaded for washing for which the additional information indicates preferred washing temperatures of 20° C., 30° C., 40° C., 30° C., 50° C. and maximum washing temperatures of 25° C., 40° C., 50° C., 40° C., and 60° C. respectively, using the first method will result in a wash temperature of 30° C., and the second method will result in a wash temperature of 20° C.

The wash temperature may also be wholly or partly based on the fabrics from which the items are made or the fact that one or more items tagged as delicates are present. If one or more delicate items are present, for example, the wash temperature may be set to a low temperature (such as 30° C.) in order that this or these items are not damaged. Fabric softener may be automatically added to the wash if items are present which will benefit from its use, however if items such as towels or synthetic fiber materials are present, fabric softener may not be automatically added. A duration of the wash may also be set in a similar way (washing hardier fabrics for longer). If a delicate item is present in the wash, the wash duration may be set to a maximum of 30 minutes and a drying phase may not be used.

Whites may benefit from a pre-wash to a greater extent than coloured or dark fabrics. Information regarding the colour of the items may be based on the particular container into which they have been loaded (which may be programmed to be associated with colours, whites, or darks as described above). Alternatively this may be based on detection of colour by a camera during loading, as also described above. If any of the items in a wash are determined to be white or pale in colour, a lower temperature may be set for the wash. If more than one factor is used to determine wash temperature or any other feature of the wash, the effect of each factor on the determined wash cycle may be suitably weighted.

Alternatively, if a white item is detected in a load that is intended for dark colours (if, for example, a white item has accidentally been placed in the container intended for coloured fabrics) then the user may be notified by an alarm system or a message sent to their portable device. The wash may also not start automatically in such a case. The user can adapt the settings to override this possibility (this can be done remotely in some embodiments).

Because a user is not required to place clothes into the drum manually, the usual front opening door to the drum can be dispensed with. Alternatively, this door may be present to give a user the option of manually filling the drum. Obviously, the door to the machine must be closed for the automatic cycle to begin. Either the user should ensure that the door remains closed, wherein an indication (visual or audible) should be provided if an automatic wash is to be initiated but the door is not closed, or the door should be configured to be automatically closed by the controller and a check should be performed by the controller before initiating a wash cycle to ensure that this step has been completed. The front opening to the drum can also take the place of the moveable opening such that the movable opening can be automatically or manually opened and clothes automatically transferred to the drum via the front of the machine (possibly through a suction tube as described above).

In an embodiment, the weight sensor can be included in the drum rather than or as well as in the base of each container. Items can be sucked up into or dropped into the drum one by one or at pre-determined time intervals, and a washing cycle started when the weight of laundry in the drum reaches a certain threshold level.

Communication between the various parts of the system illustrated in FIG. 5 may be by wired or wireless connection. Information about a wash may be transmitted to a user's personal device (mobile phone, tablet, desktop, etc.) The user is then able to track a wash cycle and to override certain automatic settings or cancel a wash if desired.

Embodiments of the present disclosure have been described with particular reference to the examples illustrated. However, it will be appreciated that variations and modifications may be made to the examples described within the scope of the present disclosure.

What is claimed is:

1. A washing machine comprising:
   a washing drum configured to wash items;
   a container configured to hold items to be washed;
   a weight sensor configured to sense the weight of the items in the container; and
   a transfer mechanism configured to automatically transfer the items from the container to the washing drum when the weight sensed by the weight sensor reaches a pre-determined threshold.

2. The washing machine of claim 1, wherein the washing drum includes a movable wall portion which can be moved to expose an opening in the washing drum wall through which the items can be transferred to the washing drum.

3. The washing machine of claim 2, wherein the moveable wall portion is mounted on rails and is moveable by sliding along the rails.

4. The washing machine of claim 2, wherein the moveable wall portion is coupled to the rest of the washing drum wall by a hinge and is moveable by rotation about the hinge.

5. The washing machine of any of claim 1, comprising a pipe through which the items can be transferred from the container to the washing drum.

6. The washing machine of claim 5, comprising a suction device for drawing the items along the pipe towards the washing drum using differential air pressure.

7. The washing machine of claim 6, comprising a plurality of suction devices located at intervals along the pipe, wherein the suction devices are operable to be progressively activated to suck the items up the pipe.

8. The washing machine of any of claim 1, comprising a plurality of containers, wherein each container is allocated to a category of the items, and a visual display configured to indicate the category of each container to the user.

9. The washing machine of any of claim 1, comprising a reader for gathering additional information about the items as they are transferred from the container to the washing drum.

10. The washing machine of claim 9, wherein the reader is a radio frequency identification (RFID) reader and the items are provided with radio frequency identification (RFID) tags.

11. The washing machine of claim 9, wherein the reader is an optical camera for taking images of labels on the items of clothing and transmitting the images to an image processor.

12. The washing machine of any of claim 9, comprising a controller for determining a wash cycle based on the additional information and automatically initiating the wash cycle once the items have been transferred to the washing drum.

13. The washing machine of claim 12, wherein determining the wash cycle comprises determining a temperature and/or a duration of the wash cycle.

\* \* \* \* \*